United States Patent
Holme et al.

(10) Patent No.: US 8,247,318 B2
(45) Date of Patent: Aug. 21, 2012

(54) MODIFYING CATALYTIC BEHAVIOR OF NANOCRYSTALS

(75) Inventors: Timothy P. Holme, San Francisco, CA (US); Friedrich B. Prinz, Woodside, CA (US)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 455 days.

(21) Appl. No.: 12/657,580

(22) Filed: Jan. 21, 2010

(65) Prior Publication Data
US 2010/0190323 A1 Jul. 29, 2010

Related U.S. Application Data

(60) Provisional application No. 61/205,765, filed on Jan. 23, 2009.

(51) Int. Cl.
*H01L 21/04* (2006.01)

(52) U.S. Cl. .......... 438/510; 257/E21.135; 204/157.52; 205/340; 423/447.3

(58) Field of Classification Search ............... 438/510; 257/E21.135; 204/157.52; 205/340; 423/447.3
See application file for complete search history.

(56) References Cited

U.S. PATENT DOCUMENTS
2010/0044209 A1 * 2/2010 Banin et al. .............. 204/157.52
* cited by examiner

*Primary Examiner* — Jami M Valentine
(74) *Attorney, Agent, or Firm* — Lumen Patent Firm

(57) ABSTRACT

The present invention provides a method of providing a desired catalyst electron energy level. The method includes providing a donor material quantum confinement structure (QCS) having a first Fermi level, and providing an acceptor QCS material having a second Fermi level, where the first Fermi level is higher than the second Fermi level. According to the method the acceptor is disposed proximal to the donor to alter an electronic structure of the donor and the acceptor materials to provide the desired catalyst electron energy level.

11 Claims, 7 Drawing Sheets

MODIFYING CATALYTIC BEHAVIOR OF NANOCRYSTALS

CROSS-REFERENCE TO RELATED APPLICATIONS

This application is cross-referenced to and claims the benefit from U.S. Provisional Application 61/205765 filed Jan. 23, 2009, and which are hereby incorporated by reference.

FIELD OF THE INVENTION

The invention relates generally to catalysts. More particularly, the invention relates to modifying properties of nanocrystals to improve catalytic behavior.

BACKGROUND

Nanocrystals (also referred to as quantum dots) are often used as catalysts for many catalytic reactions due to their high surface area to volume ratio. Reactions where nanocrystal catalysts can be used include methanation, oxygen reduction, methanol reduction, steam reforming, water-gas shift reactions, NOx oxidation, SOx oxidation, disproportionation of hydrogen peroxide, alkylation, catalytic cracking, naphtha reforming, ammonia or acid production, and other catalytic reactions. The electronic properties of nanocrystals are typically different than the properties of the bulk material. The performance and efficacy of a catalyst for a specific chemical reaction depends on these electronic properties. In particular, the Fermi level of a nanocrystal catalyst plays a crucial role in catalytic performance.

To find an appropriate catalyst, one must find a nanocrystal with the desired energy levels that are applicable for the products and reactants of the catalytic reaction. However, finding a nanocrystal catalyst with the desired energy levels can be a daunting task. Furthermore, a nanocrystal catalyst with the desired electronic properties may be costly; therefore it would be advantageous to be able to alter a less expensive or more readily available nanocrystal to have the desired energy levels. Electronic energy levels, including the Fermi level and the d-band centroid and width, of a nanocrystal are determined primarily by the nanocrystal's elemental composition, size, and morphology. By changing the composition, size, and/or morphology of the nanocrystal, one may be able to tune the energy levels indirectly to match the desired energy levels. However, these changes are non-trivial or impossible. Moreover, it is typically difficult to precisely determine how the energy levels will be altered from indirect changes to the composition, size, and/or morphology of the catalyst.

Accordingly, there is a need to develop a method of modifying catalytic behavior of nanocrystals by proximity of other nanocrystals to improve catalytic performance, such as increased energy efficiency and lifetime of catalytic systems, reduced cost, and reduced susceptibility to poisoning.

SUMMARY OF THE INVENTION

The present invention provides a method of providing a desired catalyst electron energy level. The method includes providing a donor material quantum confinement structure (QCS) having a first Fermi level, and providing an acceptor QCS material having a second Fermi level, where the first Fermi level is higher than the second Fermi level. According to the method the acceptor is disposed proximal to the donor to alter an electronic structure of the donor and the acceptor materials to provide the desired catalyst electron energy level. In nanocrystals, the ionization potential (IP) or highest occupied molecular orbital (HOMO), may be the quantity of interest rather than the Fermi level, however, for simplicity, we discuss merely the Fermi level here.

In one aspect of the invention, the acceptor is separated from the donor by a distance of up to 10 nm.

According to another aspect, a vacuum or a material, or a vacuum and a material are disposed between the donor and the acceptor. Here, the material can be an organic ligand, a polymer or an inorganic film.

In another aspect of the invention, the QCS donor material can include a nanocrystal material, a nanowire, a quantum well, or a thin film of bulk material.

In a further aspect, the QCS acceptor material can include a nanocrystal material, a nanowire, or a quantum well and a thin film of bulk material.

In yet another aspect of the invention, the donor and the acceptor materials are disposed in an electric field to enhance catalytic behavior when applied to charged, polar or polarizable molecules undergoing a catalytic reaction.

According to another aspect, the donor and the acceptor materials are disposed in a non-equilibrium state, where the non-equilibrium state induces polarization in molecules undergoing a catalytic reaction.

In one aspect, the donor and the acceptor material are disposed to decrease a poisoning susceptibility of a catalyst by a strongly-adhered adsorbate.

According to a further aspect of the invention, the donor and the acceptor materials have different properties that can include size, geometry, composition, or morphology.

In another aspect, the acceptor is disposed proximal to the donor using methods that can include Langmuir-Blodgett deposition, atomic layer deposition, stamping, microcontact printing, nanolithography, e-beam lithography, drop casting, spin coating, or SPM (AFM/STM) lithography.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figure 1:
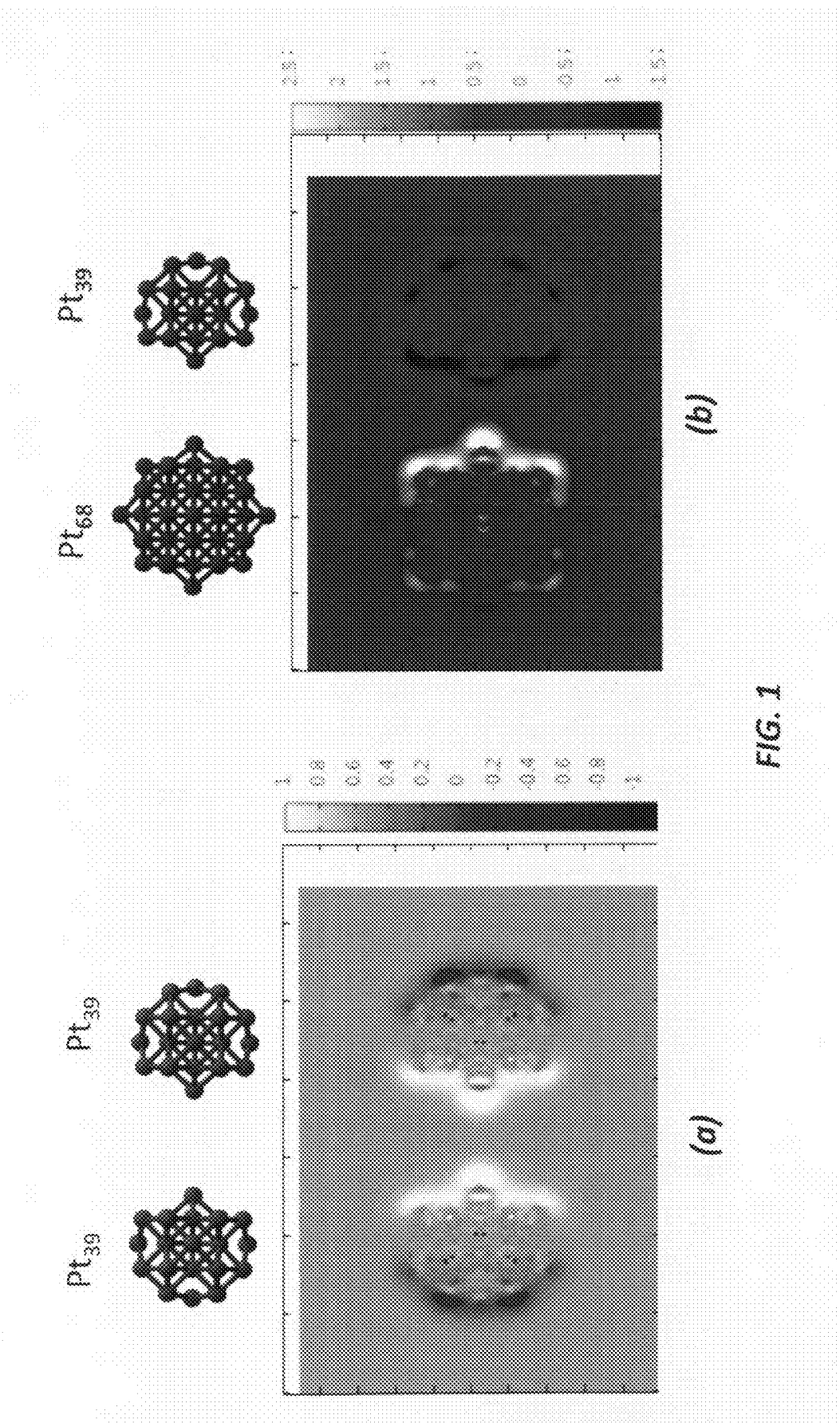
FIGS. 1a-1b shows a computer simulation of a comparison of similar and different Pt catalysts disposed proximal to each other according to the present invention.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The present invention is directed to modifying catalytic behavior of nanocrystals by proximity of other nanocrystals. The present invention relies on the changes of a nanocrystal's electronic properties due to electron transfer with a nearby nanocrystal. In particular, the electron transfer from a nanocrystal with a high Fermi level, referred to as a "donor", to one with a lower Fermi level, referred to as an "acceptor", alters the electronic structure of both nanocrystals. For some reactions and catalysts, the catalytic behavior would be improved by changing (raising or lowering) the Fermi level, or by raising or lowering or broadening or narrowing the catalyst d-band. Therefore, according to the current invention, the method of placing at least two nanocrystals of different energy levels enables tuning of the energy levels to attain desired levels, such as a desired Fermi level. In nanocrystals, the ionization potential (IP) or highest occupied molecular orbital (HOMO), may be the quantity of interest rather than the Fermi level, however, for simplicity, we discuss merely the Fermi level here. Since the proximate nanocrystals must have different energy levels, particularly Fermi levels, for electron transfer to occur, the proximate nanocrystals of a preferred embodiment generally have differences in elemental compositions, sizes, morphologies, or any combination thereof. Some exemplary donor materials can include but are not limited to Fe, Co, Au, Pt, Pd, Zr, Ag, Ni, Cu, and Ru. Some exemplary acceptor materials can include but are not limited to Fe, Co, Au, Pt, Pd, Zr, Ag, Ni, Cu, and Ru. Oxides and doped oxide materials may also be used as donor and/or acceptor materials.

In one embodiment, the donor and acceptor nanocrystals are placed approximately 0.5 to 10 nm apart, or a distance up to 10 nm to achieve electron transfer via tunneling. Preferably, a vacuum or a material (e.g. an organic ligand, a polymer, and an inorganic thin film) is placed between the donor and acceptor. Some exemplary organic ligands can include but are not limited to cyclopentadienyl, acetylacetonate, aminidate, oleic acid, oligo-(phenylene vinylene), thiol, dithiocarbamate, trioctylphosphine oxide, p-sulfonatocalix (n)arene, polydimethylaminoethyl methacrylate, alkyl phosphine, and alkyl amine. Further some exemplary polymers can include but are not limited to polyethylene, hydrogenated polynorbornene, PMMA, PVC, MEH-PPV, PEO, polystyrene, and lipids. Additionally, some exemplary inorganic thin films can include but are not limited to oxides, sulfides, selenides, nitrides, oxynitrides, arsenides, phosphides, Si, and Ge.

In one embodiment, one or both of the donor and acceptor nanocrystals can be replaced by a thin film or by a bulk material, where the thin film has a thickness in a range of a sub-monolayer to 200 nm, and the bulk material has a thickness in a range of 3 nm to 500 μm. The present invention is preferably applied to the following reactions: catalytic reactions for fuel cells, ammonia synthesis, NO reduction, methanation, methonal production, ethanol production, hydrocarbon synthesis, $O_2$ reduction, hydrogen production (e.g. water-gas shift reactions), hydrogenation and dehydrogenation, acid production (e.g. formic acid), and citral hydrogenation. It is noted that the present invention can be applied to any catalytic reaction and not limited to the above-listed reactions.

In one embodiment, an electric field is disposed between the donor and acceptor, which aids the catalytic reaction. "Band bending" is a process by which an electric dipole and an electric field are created, typically occurs as a result of electron transfer. The electric field may be used to enhance the catalytic behavior, particularly if the product, reactant, and/or intermediate states of the molecules undergoing the catalytic reaction are charged, polar, or polarizable. Alternatively, if the donor and acceptor are not allowed to equilibrate (i.e. the Fermi levels cannot achieve the same value), an electric field may remain as the driving force for the polarization that is restricted or not allowed to occur. This remaining electric field may also be used to aid the catalytic reaction.

In addition to or in replacement of improving catalytic performance, certain embodiments of the present invention are directed to modifying the electronic properties of a nanocrystal to decrease the susceptibility of a catalyst to be poisoned by a strongly-adhered adsorbate.

Modified materials, particularly nanocrystals, according to the present invention can have many advantages over existing materials. The advantages include improved catalytic performance, such as increased energy efficiency and lifetime of catalytic systems, reduced cost, and reduced susceptibility to poisoning.

Figure 2:
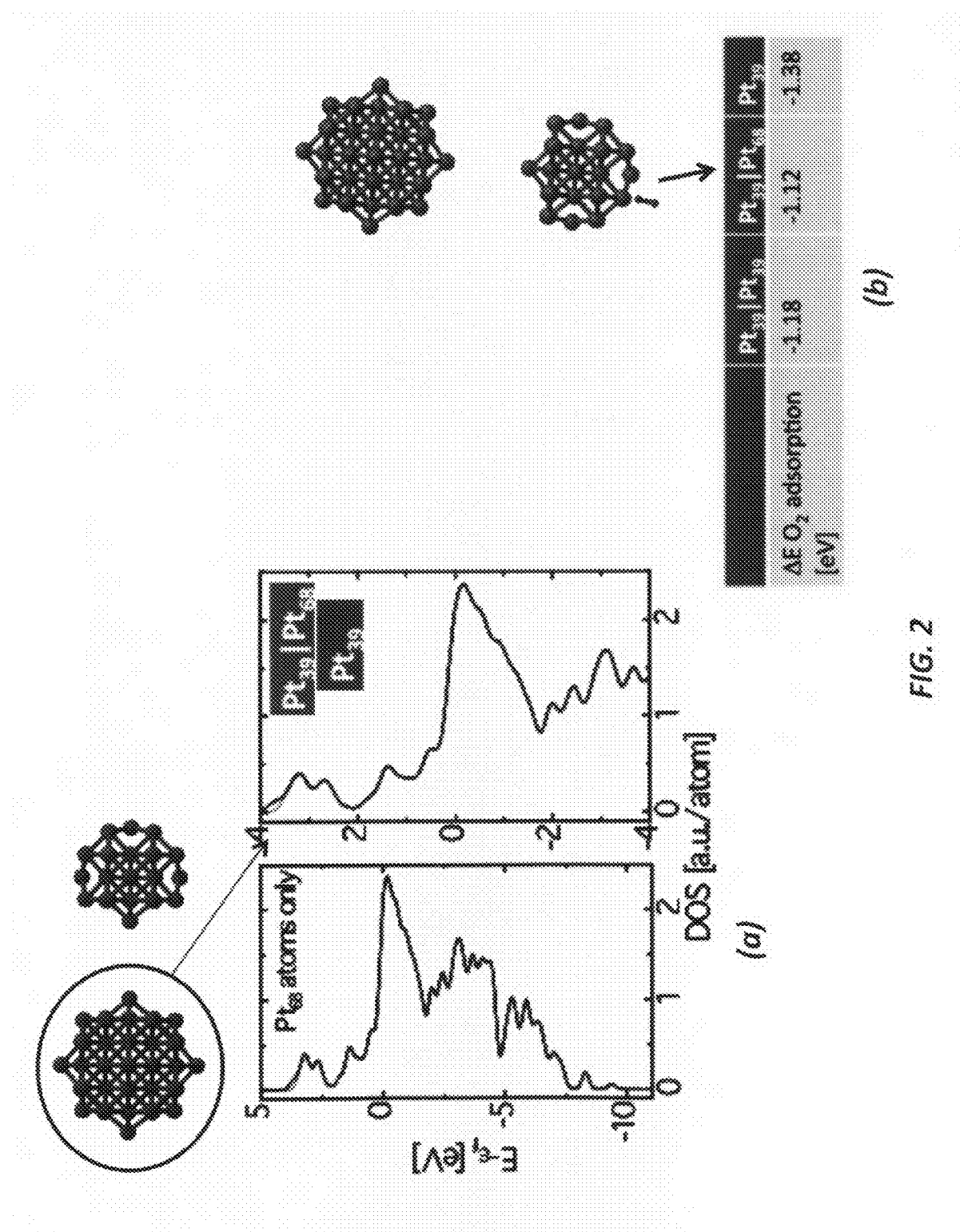
FIG. 2a-2b show a comparison of density of states between a single $Pt_{68}$ and $Pt_{39}|Pt_{68}$ and their effect on $O_2$ adsorption according to the present invention.

Referring now to the figures, FIGS. 1a-1b show a computer simulation of charge transfer between Pt QD's, where positive values denote more $e^-$ density. The simulation provides similar and different Pt catalysts disposed proximal to each other, where FIG. 1a shows two $Pt_{39}$ particles placed separated by approximately 8 Å, where some bonding occurs, and FIG. 1b shows one $Pt_{68}$ particle and one $Pt_{39}$ particle placed approximately 6.5 Å apart, where $e^-$ transfer occurs to the $Pt_{68}$ particle. Here, it is shown that the charge transferred charge sits on the edges of the QD's. Further, this simulation shows that Pt catalyst behavior is modified by changing the particle size and the type of particles disposed nearby. Pt is the most used catalyst for oxygen reduction, an important step in fuel cells. While Pt (and alloys that mostly contain Pt) is the best catalyst for that reaction, it is not ideal—it binds oxygen too strongly. As can be seen in FIG. 2a-2b, this simulation shows that Pt catalyst behavior is modified and the method of the current invention changes the activity of the Pt to make it bind oxygen more weakly.

FIGS. 2a-2b shows a comparison of density of states between a single $Pt_{68}$ and $Pt_{39}|Pt_{68}$, demonstrating the changed electronic structure of $Pt_{68}$ in the presence of a second QCS. FIG. 2b shows the effect of modified catalytic activity on $O_2$ adsorption by adjacent QCS of different energy levels according to the present invention. The interaction energy of oxygen with Pt QCS can be tuned by altering the environment of the catalyst nanocrystal.

Figure 3:
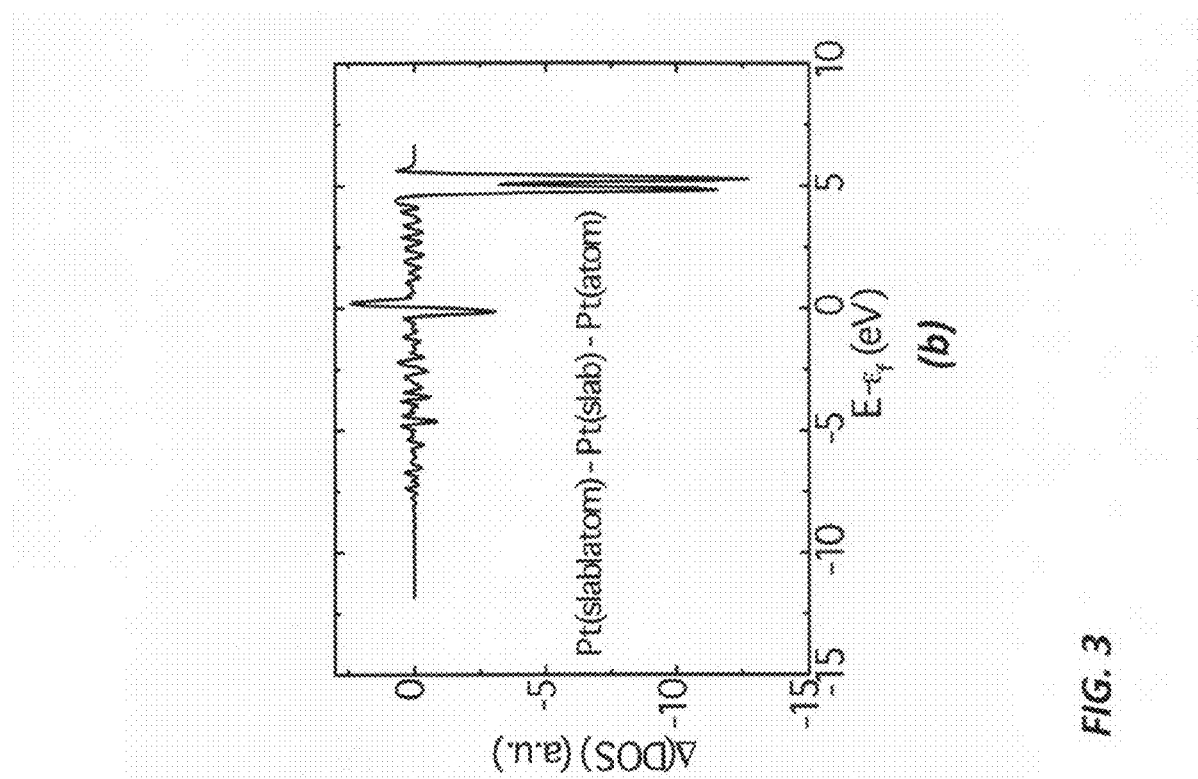
FIGS. 3a-3c show a computer simulation of a Pt Quantum Well disposed proximal to a Pt atom according to the present invention.

FIGS. 3a-3c show a computer simulation of a Pt Quantum Well disposed proximal to a Pt atom. FIG. 3a shows the simulation geometry (periodic boundary conditions are used). FIG. 3b shows how, compared to an isolated QW and isolated atom, the combined system has a difference in density of states (DOS) near the Fermi energy ($\epsilon_f$). The donor/acceptor system has shifted to higher DOS just above the Fermi level and lower DOS just below $\epsilon_f$. This will impact catalytic activity. FIG. 3c, shows a charge difference map, where polarization is evident. The atom becomes relatively positive by 0.044 e, and the QW becomes relatively negative by 0.016 e, where overall, the charge transfer from the atom to the well is of 0.060 $e^-$.

Figure 4:
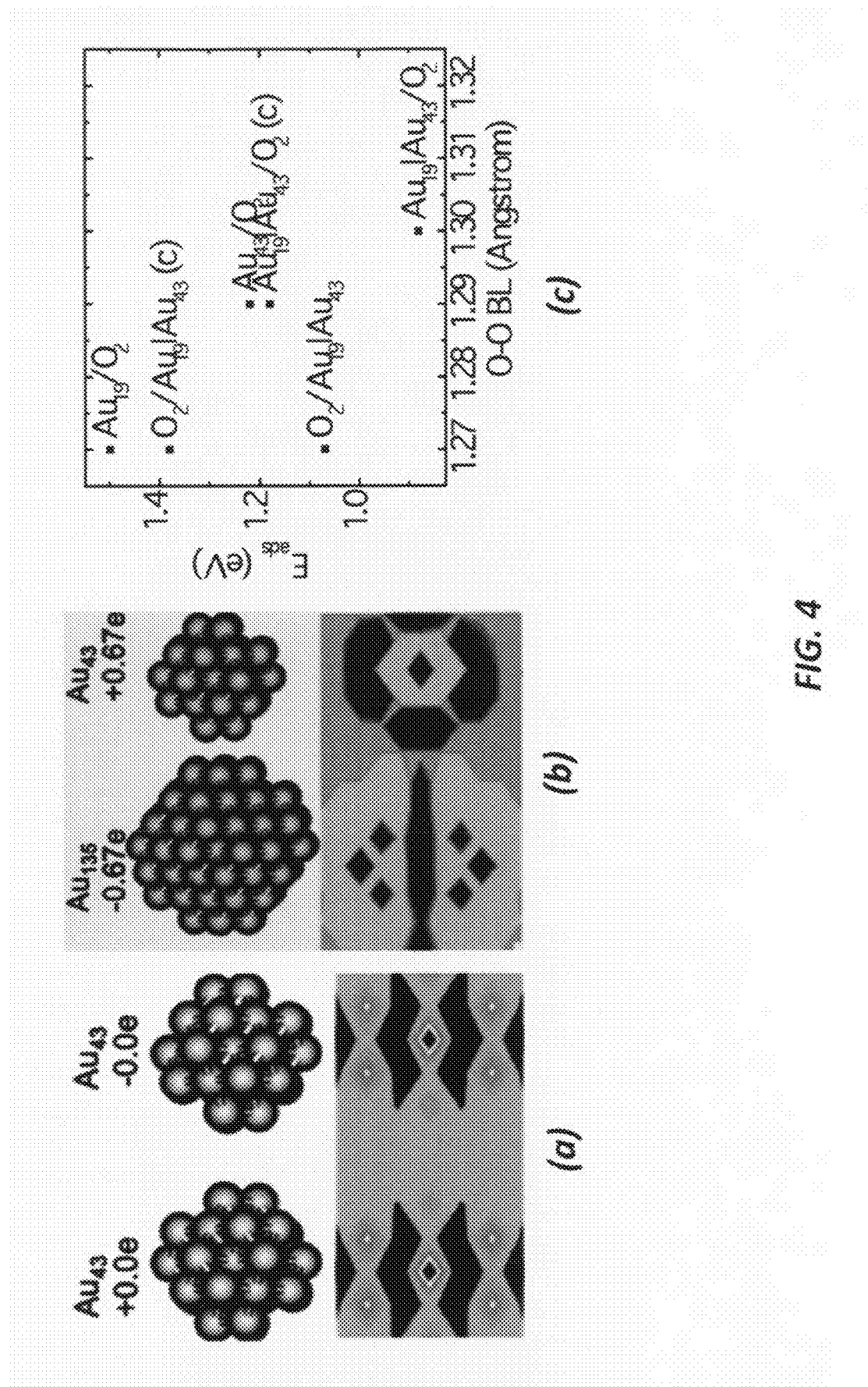
FIG. 4a-4c show the charge is delocalized over adjacent QDs and polarization results from highest occupied molecular orbital (HOMO) mismatch, as well as the effect on $O_2$ adsorption of the Au nanocrystal interaction according to the present invention.

FIG. 4a shows that the symmetric system of two QCS of the same size and material does not develop an electron transfer. FIG. 4b shows the charge delocalized over adjacent QDs and the polarization that results from highest occupied molecular orbital (HOMO) mismatch of the donor/acceptor according to the present invention. FIG. 4c shows $O_2$ bonding energy to Au QD donor/acceptor pairs. TABLE 1 below shows a comparison of QCS distance [Å], O—O length [Å], and adsorption energy [eV] for different $Au_{xx}$ structures and $O_2$ molecules.

TABLE 1

| | $O_2$ | $Au_{19}/O_2$ | $Au_{43}/O_2$ | $Au_{19}|Au_{43}/O_2$ | $O_2/Au_{19}|Au_{43}$ | $Au_{19}|Au_{43}/O_2$ | $O_2/Au_{19}|Au_{43}$ |
|---|---|---|---|---|---|---|---|
| QCS [Å] | N/ | N/A | N/A | 16.7 | 16.7 | 4.7 | 4.7 |
| O—O [Å] | 1.2 | 1.27 | 1.29 | 1.30 | 1.27 | 1.29 | 1.27 |
| $E_{ads}$ [eV] | — | 1.50 | 1.22 | 0.88 | 1.07 | 1.18 | 1.38 |

Figure 5:
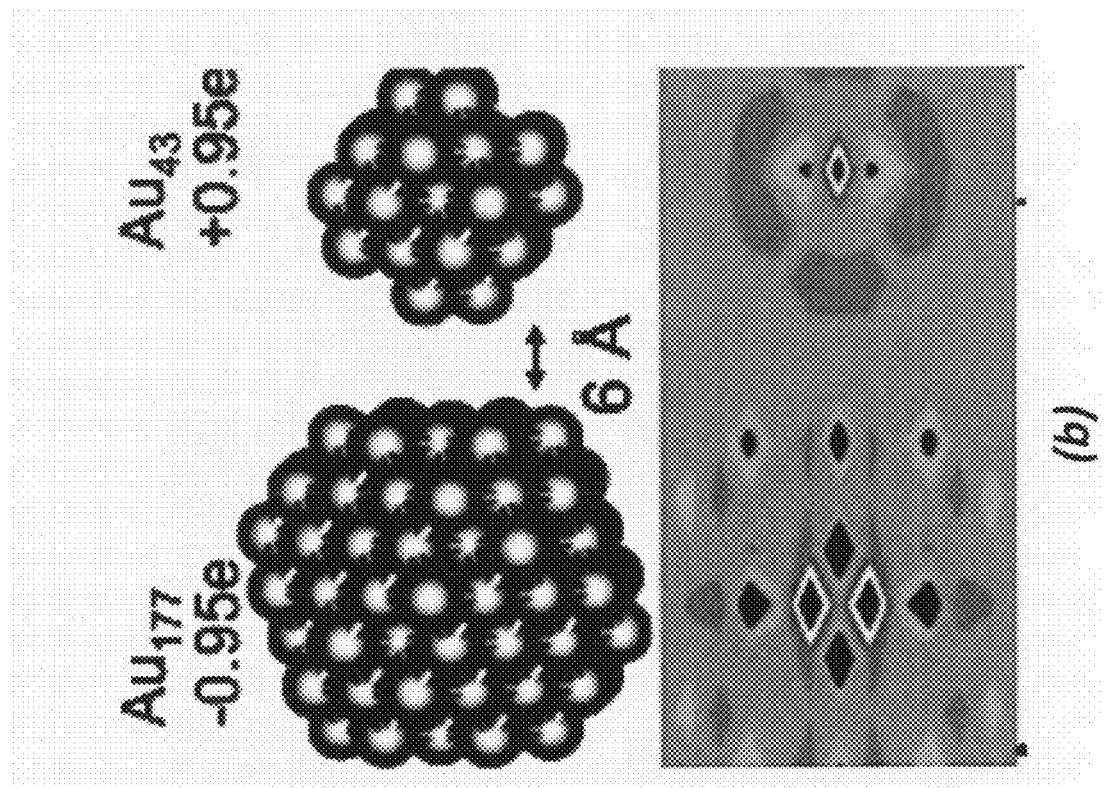
FIG. 5a-5b show how wavefunction overlap depends on QD spacing, where larger polarization occurs when wavefunctions do not overlap according to the present invention.
Figure 5:
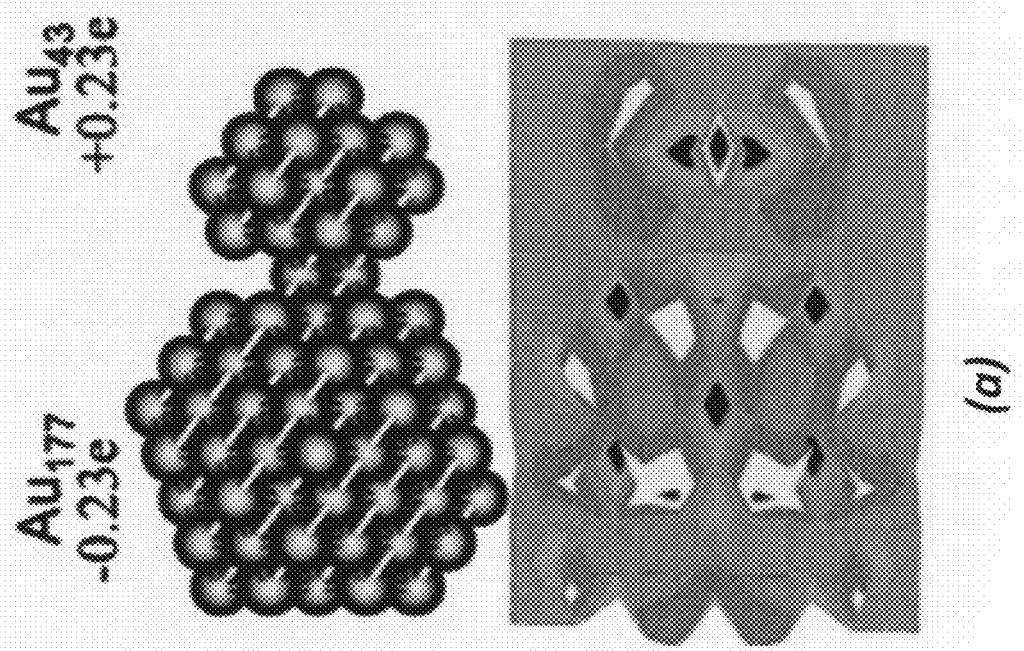

FIG. 5a-5b show how wavefunction overlap depends on QD spacing, where larger polarization occurs when wavefunctions do not overlap according to the present invention. Charge transfer from a donor QCS to an acceptor QCS is demonstrated in the result of this calculation of differently sized Au QCS.

Figure 6:
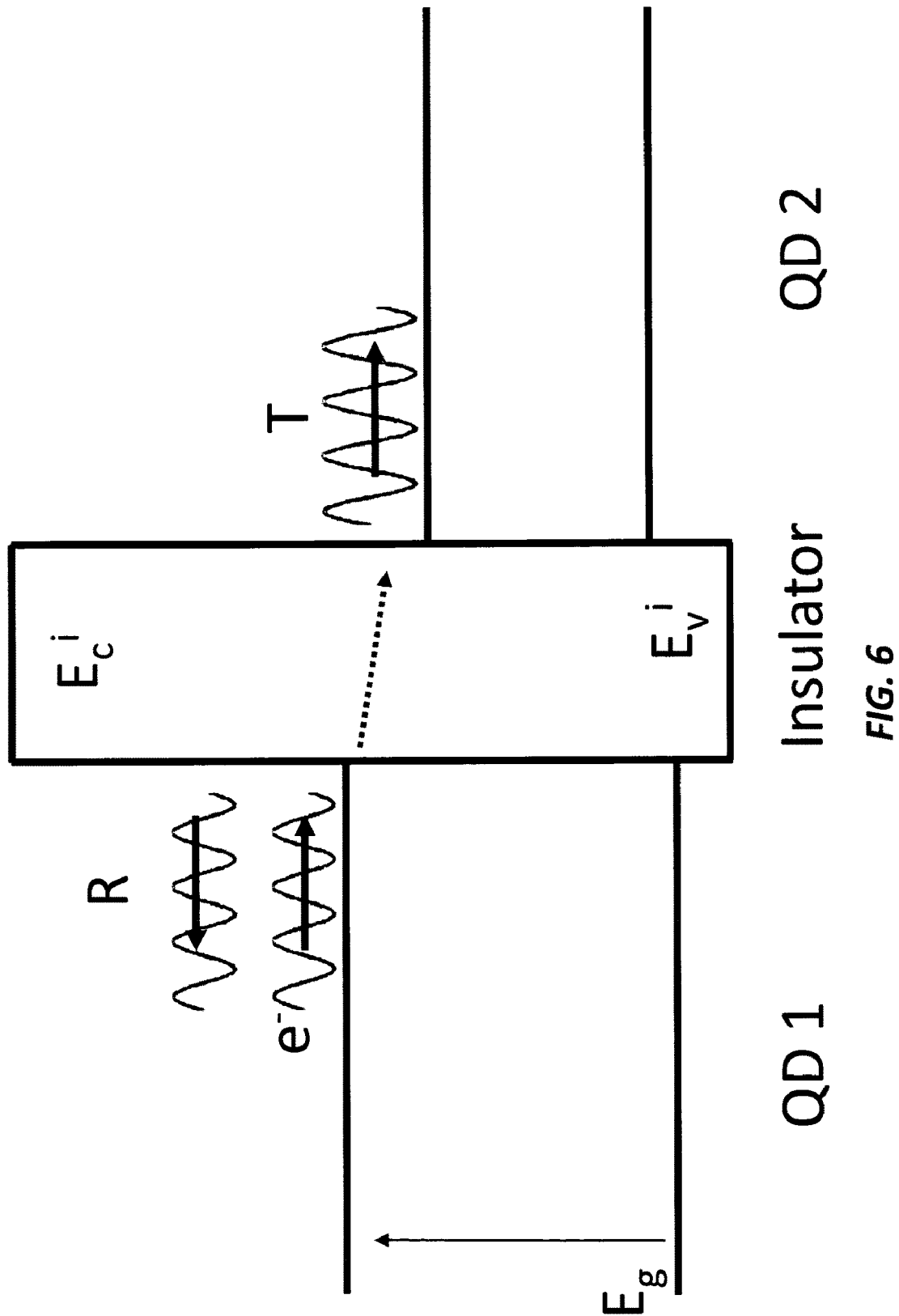
FIG. 6 shows a schematic drawing of energy levels in two different QDs separated by an insulator or vacuum according to the present invention.

FIG. 6 shows a schematic drawing of energy levels in two different media separated by an insulator or vacuum according to the present invention. Electron tunneling may occur through the insulator or vacuum from a higher energy level to a lower energy level. By the mechanism of electron tunneling, the donor and acceptor QCS of the present invention may transfer charge and become polarized, thereby altering chemical reactivity.

Figure 7:
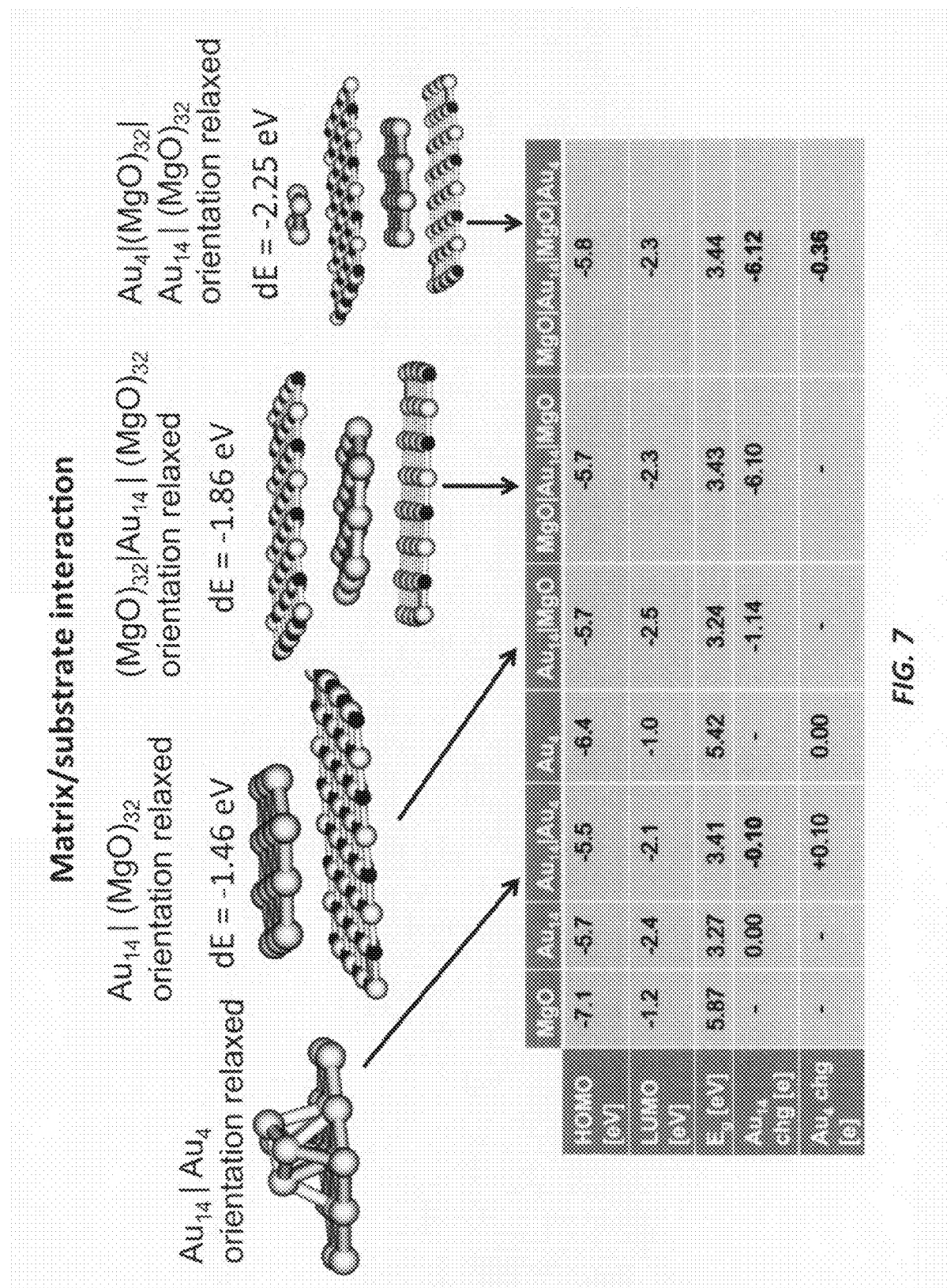
FIG. 7 shows a chart of different matrix/substrate interactions with catalyst nanocrystals according to the present invention.

FIG. 7 shows a chart of different matrix/substrate interactions with nanocrystal catalysts according to the present invention. In this calculation, the catalyst support is MgO, and the donor and acceptor catalyst particles are differently sized Au QCS. We see that the presence of the support, in this case, has relatively little effect on the electronic structure of the catalyst (see the HOMO and LUMO levels of $Au_{14}$ with and without the presence of MgO). However, the donor and acceptor still exchange charge through the MgO matrix, thereby altering chemical reactivity and catalytic performance. While the previous figures have shown charge transfer between donor and acceptor, this result shows that a material may be placed in between the donor and acceptor catalyst and still allow the desired electronic structure modification.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, there may be more than one donor QCS or more than one acceptor QCS. The donor and acceptor may be of different sizes, morphologies, materials, or any combinations of those traits.

All such variations are considered to be within the scope and spirit of the present invention as defined by the following claims and their legal equivalents.

What is claimed:

1. A method of providing a desired catalyst electron energy level, comprising:
   a. providing a donor material having a first Fermi level, wherein said donor material comprises a quantum confinement structure (QCS) of said donor material; and
   b. providing an acceptor material having a second Fermi level, wherein said acceptor material comprises a quantum confinement structure (QCS) of said acceptor material, wherein said first Fermi level is higher than said second Fermi level and said acceptor is disposed proximal to said donor to alter an electronic structure of said donor and said acceptor material to provide said desired catalyst electron energy level.

2. The method of providing a desired catalyst electron energy level of claim 1, wherein said acceptor is separated from said donor by a distance up to 10 nm.

3. The method of providing a desired catalyst electron energy level of claim 1, wherein a i) vacuum, ii) a material, or i) and ii) is disposed between said donor and said acceptor.

4. The method of providing a desired catalyst electron energy level of claim 3, wherein said material is selected from the group consisting of an organic ligand, a polymer and an inorganic film.

5. The method of providing a desired catalyst electron energy level of claim 1, wherein said QCS donor material is selected from the group consisting of a nanocrystal material, a nanowire, a quantum well, and a thin film of bulk material.

6. The method of providing a desired catalyst electron energy level of claim 1, wherein said QCS acceptor material is selected from the group consisting of a nanocrystal material, a nanowire, and a quantum well and a thin film of bulk material.

7. The method of providing a desired catalyst electron energy level of claim 1, wherein said donor and said acceptor materials are disposed in an electric field to enhance catalytic behavior when applied to charged, polar or polarizable molecules undergoing a catalytic reaction.

8. The method of providing a desired catalyst electron energy level of claim 1, wherein said donor and said acceptor materials are disposed in a non-equilibrium state, wherein said non-equilibrium state induces polarization in molecules undergoing a catalytic reaction.

9. The method of providing a desired catalyst electron energy level of claim 1, wherein said donor and said acceptor material are disposed to decrease a poisoning susceptibility of a catalyst by a strongly-adhered adsorbate.

10. The method of providing a desired catalyst electron energy level of claim 1, wherein said donor and said acceptor materials have different properties selected from the group consisting of size, geometry, composition, and morphology.

11. The method of providing a desired catalyst electron energy level of claim 1, wherein said acceptor is disposed proximal to said donor using methods selected from the group consisting of Langmuir-Blodgett deposition, spin casting, drop casting, atomic layer deposition, stamping, microcontact printing, nanolithography, e-beam lithography, and SPM lithography.

* * * * *